United States Patent Office 3,222,318
Patented Dec. 7, 1965

3,222,318
POLYPROPYLENE STABILIZED WITH DITHIOTRIGLYCOL DILAURATE
Hans Z. Lecher, Plainfield, N.J., and Harry Braus, Springdale, Ohio, assignors to National Distillers and Chemical Corporation, New York, N.Y., a corporation of Virginia
No Drawing. Filed Sept. 11, 1962, Ser. No. 222,942
2 Claims. (Cl. 260—45.85)

This invention relates to new compositions of matter and particularly to new compositions of matter comprising polymers of aliphatic olefins stabilized against molecular degradation using esters of dithiotriglycols, and processes therefor.

Polymers of aliphatic olefins, such as for example polypropylene, have numerous valuable properties which permit them to be used in the manufacture of pipe, film, wire, coating or various molded objects such as bottles and the like. These polymers have high tensile strength, are not subject to stress cracking, and display very little creep under load. It has been observed, however, that such polymers under conditions of elevated temperature and/or mechanical working, particularly in the presence of oxygen, undergo molecular degradation resulting in a deterioration of physical properties. Adequate stabilization of such polymers is of utmost importance in order to protect the polymer during fabrication and use. The molecular breakdown which occurs in these polymers during fabrication is evidenced both by a substantial increase in the melt flow rate and in the color of the polymer.

It is an object of our invention to provide a method of stabilizing polymers of aliphatic olefins against thermal and mechanical degradation. Another object is to provide a stabilized polymer of an aliphatic olefin which can be processed under conditions of elevated temperature and mechanical working without substantial increase in the melt flow rate and without important color changes.

Still another object is to provide compositions comprising as a major component polymers of aliphatic olefins and as a minor component esters of dithiotriglycols, alone or together with other known stabilizers for polymers of aliphatic olefins. Other objects will appear hereinafter.

It has been discovered that polymers of aliphatic olefins having from 2 to 6 carbon atoms per molecule can be stabilized against degradation by incorporating into the polymer esters of compounds designated herein as "dithiotriglycols," known also as 1,10-dioxa-4,7-dithiadecane. Polymers of ethylene, propylene, the butenes, hexenes and copolymers thereof are contemplated.

The esters, both diesters and monoesters, of dithiotriglycols which are suitable for use as stabilizers in this invention have the formula $$RO(CH_2)_yS(CH_2)_zS(CH_2)_yOR'$$

wherein $y$ designates an integer from 2 to about 4 and $z$ designates an integer from 2 to about 4, and wherein R and R' are the residues of a saturated fatty acid having from about 10 to 22 carbons, or R alone can be hydrogen. Examples of such compounds include dithiotriglycol monolaurate, dithiotriglycol monostearate, dithiotriglycol dilaurate, dithiotriglycol distearate and the corresponding esters of

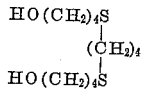

The analogous compounds derived from the residues of other fatty acids such as capric, myristic, palmitic, arachidic, and the like may also be used.

The dithiotriglycol compounds are preferably prepared by the reaction of a sodium hydroxy-mercaptide with a dihaloalkane in which the two halogen atoms are on different carbon atoms, according to the following equation:

$$2HO(CH_2)_ySNa + X(CH_2)_zX$$
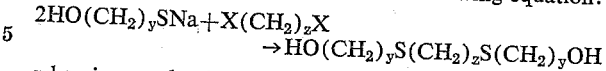

wherein $z$ and $y$ have the meaning above defined, and X stands for a halogen atom. The dithiotriglycol compounds may also be prepared by the reaction of 2 moles of $HO(CH_2)_yCl$ with one mole of $NaS(CH_2)_zSNa$, all of which are well known reactions.

These compounds are designated as "dithiotriglycols," the name being considered as analogous to the common name "thiodiglycol" for $HOCH_2CH_2SCH_2CH_2OH$.

The dithiotriglycol compound is then esterified with approximately two equivalents of the desired fatty acid. The monoesters are prepared by a similar procedure using about a onefold excess of dithiotriglycol.

In a preferred embodiment of the invention, dithiotriglycol is prepared by reacting sodium hydroxy-mercaptide with 1,2-dichloroethane in approximately a two to one molar ratio. The dithiotriglycol is then esterified with lauric acid to prepare the tester desired. The following examples are presented to illustrate the invention and are not intended in any way to limit it thereto.

EXAMPLE I

*Preparation of dithiotriglycol*

To a one liter, 3-necked indented flask equipped with a stirrer, condenser, and a dropping funnel was added 450 ml. of absolute ethanol. 23 g. of sodium was dissolved in the alcohol. The solution was cooled and 78 g. of 2-mercaptoethanol carefully added. The solution was heated to reflux, cooled somewhat, and 54.5 g. of 1,2-dichloroethane added dropwise. The reaction mixture was heated under reflux for one hour. A Dean-Stark trap was then inserted between the flask and condenser and 350 ml. of ethanol collected. The residue was cooled and the precipitated sodium chloride filtered and washed several times with small portions of ethanol. The ethanolic solution was evaporated on the steam bath to yield 84.2 g. (85%) of crude product. Purification was accomplished by Soxhlet extraction of the crude product with ether and crystallization from the ether at 0° C. Yield, 56.5 g., M.P., 59° C.

EXAMPLE II

*Preparation of dithiotriglycol dilaurate*

A mixture of 40.0 g. of lauric acid and 18.2 g. of dithiotriglycol was heated at 170–200° C. for 6 hours during which time 3 ml. of water was collected. The reaction mixture was taken up in 100 ml. of benzene, washed with water, 5% sodium hydroxide solution and again with water. The organic layer was separated and filtered. The benzene was evaporated and the residue recrystallized from 300 ml. of hexane to yield 36.3 g. (67%) of product, M.P., 48–52° C.

| Percent | Calc. | Found |
|---|---|---|
| C | 65.88 | 65.65 |
| H | 10.69 | 10.65 |
| S | 11.73 | 11.3; 11.9 |

These esters may be mixed with the polymer in any suitable manner that will effect thorough distribution. This can be accomplished in a machine suitable for mixing solids, as by milling the polyolefin with the additive on heated rolls, such as are used in the compounding of rubber, or on other suitable milling or mixing equipment, such as for example, a Banbury mixer. Instead of adding the agent to the polymer in the solid or molten state, it can be added to a solution or suspension of polymer in an organic solvent or to an aqueous dispersion thereof and the volatile solvent subsequently removed by vaporization.

In general, the amount of agent to be added to the polyolefin depends upon the degree and kind of stabilization desired. The amount of agent added can vary from 0.001% to 5.0% based on the weight of the polyolefin, but as a rule it is preferred to use the minimum amount required to achieve the desired results. The prefererd amount used will ordinarily vary from 0.05 to 0.5 part by weight per hundred parts or percentage of polyolefin.

These thiodiglycol esters may be used in combinations with other stabilizers, and in particular those of the hindered bis-phenol type such as the commercial product known as Cyanamid 2246 which is a derivative of 2,2'-dihydroxydiphenylmethane manufactured by the American Cyanamid Co.; alleged to be 2,2'-methylene-bis(4-methyl-6-tertiarybutyl-phenol). The novel dithiotriglycol esters may also be used in combination with other stabilizers of the hindered bis-phenol type such as Cyanamid 162 which is 2,2'-methylene-bis(4-ethyl-6-tertiarybutyl-phenol); Ethyl Corporation Antioxidant 712 which is 4,4'-bis(2,6-di-tertiarybutyl-phenol); or Ethyl Corporation Antioxidant 762 which is 2,6-di-tertiarybutyl-α-methoxy-p-cresol.

There are certain practical commercial advantages that often accompany the use of such combinations of stabilizers, as distinguished from the use of a single stabilizer material or compound. For example, one of the stabilizers of the combination might be costly or difficult to acquire in commercial amounts while the other stabilizer of the combination might be relatively cheap and readily available. In such a situation it is desirable to be able to substitute the cheaper stabilizer for a portion of the more expensive stabilizer and still be able to obtain good stabilization.

EXAMPLE III

Testing

The thermal and oxidative breakdown are determined by measuring the change in flow rate (ASTM D-1238-57T, 2160 g. load; 190° C. for polyethylene and 230° C. for polypropylene) and by observing the color change upon extended milling at 350° F. The samples for testing are prepared in the following manner:

A sample of polypropylene (0.905 g./ml. density, 5.9 g./10 min. flow rate at 230° C.) free of stabilizers and in the form of a 10 mesh powder and the desired quantity of stabilizer as a 1% solution in benzene or acetone are charged to a Hobart mixer. The mixture is allowed to stir until all of the solvent has evaporated. A 400 gram aliquot of the resultant composition is then milled on a two-roll, differential speed, rubber mill at 350° F. Starting from the time at which all of the polymer has melted and banded, 30 gram samples of polymer are removed at 5, 10, 20, 30, 45 and 60 minute intervals.

Portions of each such sample are used for a determination of melt flow rate and for the preparation of a pressed 1 inch by 1 inch by 50 mil sheet for mounting on white cardboard for color comparison.

Test results are given in the following table to illustrate the use of an ester of dithiotriglycol in the stabilization of a polyolefin.

TABLE

| Stabilizer | Concentration, wt. percent of polymer [1] | Milling Time, minutes at 330-340° F. | Melt Flow Rate | | Final Color |
|---|---|---|---|---|---|
| | | | Initial | Final | |
| None | 0 | 0 | 0.5 | | White—no haze. |
| | 0 | 10 | | 4.66 | |
| | 0 | 20 | | 15.6 | Gray. |
| Dithiotriglycol dilaurate | 0.5 | 60 | 0.5 | 2.23 | White—no haze. |
| Cyanamid 2246 | 0.5 | 60 | 0.5 | 0.77 | Pale yellow. |
| Dithiotriglycol dilaurate | 0.25 | 60 | 0.5 | 0.68 | Do. |
| Cyanamid 2246 | 0.25 | | | | |

[1] Profax 6501 (unstabilized polypropylene)—commercial polypropylene sold by Hercules Powder Co.

In the above table the reference standard for determining improvement is the polymer blank without stabilizer. Dithiotriglycol dilaurate exhibits significant improvement in both mill stability and color over the blank, which degraded in less than 30 minutes under the test conditions. In combination with Cyanamid 2246, the antioxidant properties are superior over 60 minutes in melt flow rate to the blank or to Cyanamid 2246 used alone.

As will be evident to those skilled in the art, various modifications of this invention can be made or followed in the light of the foregoing disclosure and discussion without departing from the spirit or scope thereof.

What is claimed is:

1. Polypropylene stabilized with 0.05 to 0.5 part by weight per 100 parts of polymer with dithiotriglycol dilaurate having the formula:

$$CH_3(CH_2)_{10}COOCH_2CH_2SCH_2CH_2SCH_2CH_2OOC(CH_2)_{10}CH_3$$

2. Polypropylene stabilized with 0.05 to 0.5 part by weight per 100 parts of polymer with a mixture of dithiotriglycol dilaurate having the formula

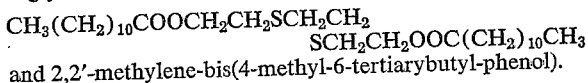

$$CH_3(CH_2)_{10}COOCH_2CH_2SCH_2CH_2SCH_2CH_2OOC(CH_2)_{10}CH_3$$

and 2,2'-methylene-bis(4-methyl-6-tertiarybutyl-phenol).

References Cited by the Examiner

UNITED STATES PATENTS

| 2,454,568 | 11/1948 | Pollack | 260—399 |
| 2,463,452 | 3/1949 | Yule | 260—31.8 |
| 2,551,087 | 5/1951 | Barnhardt et al. | 260—31.8 |

FOREIGN PATENTS

| 572,659 | 2/1959 | Italy. |

DONALD E. CZAJA, *Primary Examiner.*

LEON J. BERCOVITZ, *Examiner.*